United States Patent
Watanabe

(10) Patent No.: US 10,007,404 B2
(45) Date of Patent: Jun. 26, 2018

(54) TERMINAL APPARATUS, PROGRAM, METHOD OF CALLING FUNCTION, AND INFORMATION PROCESSING SYSTEM

(71) Applicant: Taichi Watanabe, Kanagawa (JP)

(72) Inventor: Taichi Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 354 days.

(21) Appl. No.: 14/693,981

(22) Filed: Apr. 23, 2015

(65) Prior Publication Data

US 2015/0339017 A1 Nov. 26, 2015

(30) Foreign Application Priority Data

May 21, 2014 (JP) .................................. 2014-105225

(51) Int. Cl.
*G06F 3/048* (2013.01)
*G06F 3/0484* (2013.01)
*H04L 29/06* (2006.01)
*G06F 3/023* (2006.01)
*G06F 3/0488* (2013.01)

(52) U.S. Cl.
CPC .......... *G06F 3/0484* (2013.01); *G06F 3/0233* (2013.01); *G06F 3/04886* (2013.01); *H04L 67/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,913,176 B1 * | 3/2011 | Blattner | ................... | H04L 51/04 715/758 |
| 8,010,474 B1 * | 8/2011 | Bill | ........................ | A63F 13/12 706/46 |
| 2006/0218499 A1 * | 9/2006 | Matthews | ......... | G06F 17/30616 715/765 |
| 2007/0113181 A1 * | 5/2007 | Blattner | .................. | G06F 3/011 715/706 |
| 2007/0266090 A1 * | 11/2007 | Len | ........................ | G06F 17/211 709/204 |

(Continued)

FOREIGN PATENT DOCUMENTS

| | | | | |
|---|---|---|---|---|
| EP | 2879355 A1 * | 6/2015 | ........ | G06F 17/30067 |
| JP | 2010-087570 | 4/2010 | | |

(Continued)

OTHER PUBLICATIONS

Office Action dated Feb. 13, 2018 issued with respect to the basic Japanese Patent Application No. 2014-105225.

*Primary Examiner* — Hien L Duong
(74) *Attorney, Agent, or Firm* — IPUSA, PLLC

(57) ABSTRACT

A terminal apparatus having a plurality of functions includes an operation unit that receives from a user an input of at least one among a character, a number, and a symbol into an entry field, which is provided on a screen for using one function among the plurality of functions; and a function call unit that performs a function calling process of calling another function among the plurality of functions other than the one function when the input of at least one among the character, the number, and the symbol includes the character, the number, or the symbol for calling any function among the plurality of functions.

9 Claims, 17 Drawing Sheets

(56) References Cited

U.S. PATENT DOCUMENTS

| | | | | |
|---|---|---|---|---|
| 2008/0046842 | A1* | 2/2008 | Kim | G06F 3/0236 715/847 |
| 2008/0059570 | A1* | 3/2008 | Bill | G06Q 10/10 709/203 |
| 2008/0216022 | A1* | 9/2008 | Lorch | G06F 3/04817 715/847 |
| 2008/0242353 | A1* | 10/2008 | Willey | H04M 1/72552 455/556.2 |
| 2009/0083115 | A1* | 3/2009 | Pearson | G06Q 10/06 705/7.13 |
| 2009/0153372 | A1* | 6/2009 | Wu | G06F 3/0238 341/22 |
| 2010/0083103 | A1* | 4/2010 | Paek | G06F 17/3064 715/256 |
| 2010/0266108 | A1* | 10/2010 | Shiroshima | H04M 3/42 379/88.19 |
| 2013/0110940 | A1* | 5/2013 | Pasquero | H04M 1/72552 709/206 |
| 2013/0159919 | A1* | 6/2013 | Leydon | G06F 3/0236 715/780 |
| 2013/0244743 | A1* | 9/2013 | Barclay | G07F 17/3227 463/12 |
| 2013/0339459 | A1 | 12/2013 | Kumashio | |
| 2014/0052633 | A1* | 2/2014 | Gandhi | G06Q 40/02 705/44 |
| 2014/0122297 | A1* | 5/2014 | Dunlap | H04W 4/14 705/26.61 |
| 2014/0136990 | A1* | 5/2014 | Gonnen | H04L 51/18 715/752 |
| 2015/0002483 | A1* | 1/2015 | Case | G06F 3/04883 345/179 |
| 2015/0002485 | A1* | 1/2015 | Case | G06F 3/04883 345/179 |
| 2015/0127753 | A1* | 5/2015 | Tew | G06Q 30/0251 709/206 |
| 2015/0286371 | A1* | 10/2015 | Degani | G06F 17/274 705/14.64 |
| 2015/0382164 | A1* | 12/2015 | Chung | H04W 4/16 455/414.1 |
| 2016/0094671 | A1* | 3/2016 | Hirakata | H04L 67/22 709/206 |

FOREIGN PATENT DOCUMENTS

| | | |
|---|---|---|
| JP | 2013-134777 | 7/2013 |
| JP | 2013-257792 | 12/2013 |

* cited by examiner

FIG.10

[{"id":"file_storage_a","address": "192.168.0.2","file_storage_id": "file_storage_a_id", "activate":"http://192.168.0.2/activate/user1/abcdefghijklmnopqrstuvwxyz", "userid":"User A", "password": "01234567"}]

| FUNCTION LARGE CLASSIFICATION | FUNCTION SMALL CLASSIFICATION |
|---|---|
| UPLOAD | CAMERA, ALBUM |
| PRINT | IP PRINT, TWO-DIMENSIONAL CODE READ |
| PROJECTION | IP PROJECTION, TWO-DIMENSIONAL CODE READ |
| TRANSFER | FAX, INTER APPLICATION COOPERATION |

TERMINAL APPARATUS, PROGRAM, METHOD OF CALLING FUNCTION, AND INFORMATION PROCESSING SYSTEM

BACKGROUND OF THE INVENTION

1. Field of the Invention

The present invention relates to a terminal apparatus, a program, a method of calling a function, and an information processing system.

2. Description of the Related Art

For example, an example of a method of providing an extended service provides an extended service using a message input window included in a chat window for providing an instant messaging service. The example of the method of providing the extended service provides the extended service by determining an input of a target user in a way different from the chat message in response to a type of gesture of the target user (for example, Patent Document 1).

There is a case where the user uses a function (e.g., a chat function) of exchanging information such as a comment between multiple users displayed on a terminal apparatus such as a smart device through a screen for exchanging information such as the comment between the multiple users.

However, in a case where a function (e.g., an upload function) other than the chat function is used, the user is required to close a chat screen and open a screen for the function other than the chat function. In this case, there are problems that operation flows increase and the operations are burdensome. Regardless of the chat function, problems similar thereto occur in a case where a screen for one function is displayed and another one function is simultaneously used.

Patent Document 1: Japanese Laid-Open Patent Publication No. 2013-134777

SUMMARY OF THE INVENTION

It is an object of at least one embodiment of the present invention to provide a terminal apparatus, a program, a method of calling a function, and an information processing system, with which an effort of the user in reading out another one function during the use of one function can be saved.

One aspect of the embodiments of the present invention may be to provide a terminal apparatus having a plurality of functions including an operation unit that receives from a user an input of at least one among a character, a number, and a symbol into an entry field, which is provided on a screen for using one function among the plurality of functions; and a function call unit that performs a function calling process of calling another function among the plurality of functions other than the one function when the input of at least one among the character, the number, and the symbol includes the character, the number, or the symbol for calling any function among the plurality of functions.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 10 illustrates an exemplary structure of information acquired from the two-dimensional code.

DETAILED DESCRIPTION OF THE PREFERRED EMBODIMENTS

A description is given below, with reference to the FIG. 1 through FIG. 25 of embodiments of the present invention. Where the same reference symbols are attached to the same parts, repeated description of the parts is omitted.

REFERENCE SYMBOLS TYPICALLY DESIGNATE AS FOLLOWS 1,1A: information processing system;
11: relay server;
12: chat server;
13: smart device;

14: file server;
15: firewall (FW);
16: multifunction peripheral (MFP);
17: projector;
18: interactive whiteboard (IWB);
21: display unit;
22: operation unit;
23: chat send and receive unit;
24: file link generation unit;
25: two-dimensional code read unit;
26: setup memory unit;
27: file list acquisition unit;
28: file send and receive unit;
29: file administration unit;
30: function call unit;
31: function unit;
41: chat send and receive unit;
42: user and group administration unit;
51: data receive unit;
52: data memory unit;
53: request reception unit;
54: data determination unit;
55: data send unit;
61: file send and receive unit;
62: user administration unit;
63: file administration unit;
64: log administration unit;
65: request inquiry unit;
66: request process unit;
500: computer;
501: input device;
502: display device;
503: external I/F;
503a: recording medium;
504: RAM;
505: ROM;
506: CPU;
507: communication I/F;
508: HDD;
601: CPU;
602: ROM;
603: RAM;
604: EEPROM;
605: CMOS sensor;
606: acceleration and direction sensor;
607: recordable media;
608: media drive;
609: audio input unit;
610: audio output unit;
611: antenna;
612: communication unit;
613: wireless LAN communication unit;
614: short-range wireless communication antenna;
615: short-range wireless communication unit;
616: display;
617: touch panel;
618: battery;
619: bus line;
B: bus; and
N1,N2: network.

First Embodiment

System Structure

Figure 1:
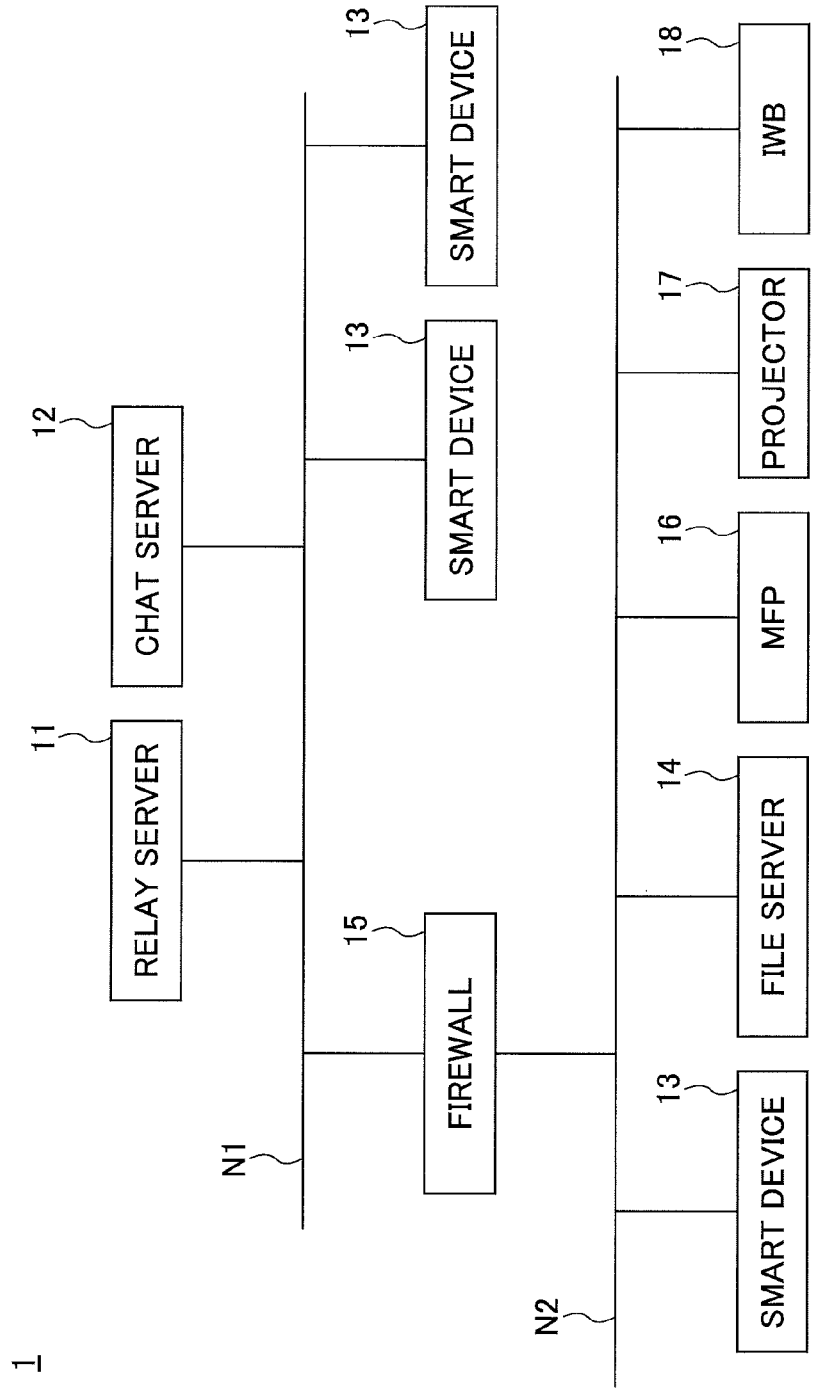
FIG. 1 illustrates an exemplary structure of an information processing system of an embodiment.

FIG. 1 illustrates an exemplary structure of an information processing system of a first embodiment. Referring to FIG. 1, the information processing system 1 includes a relay server 11, a chat server 12, smart devices 13, a file server 14, a PC 15, and a firewall (FW) 15. Further, the information processing system 1 may be structured to include a multifunction peripheral (MFP) 16, a projector 17, and an interactive whiteboard (IWB) 18.

The relay server 11, the chat server 12, and at least a part of the smart devices 13 are connected to a global network N1 such as the Internet. At least a part of the smart devices 13, the file server 14, the MFP 16, the projector 17, and the IWB 18 are connected to a local network N2 such as a LAN. The network N1 and the network N2 are connected through the FW 15.

The relay server 11 temporarily receives a request for the file server 14 connected to the network N2 from the chat server 12 or the smart device 13, each of which is connected to the network N1, and delivers (relays) the request to the file server 14.

The chat server 12 receives a conversational content for performing a chat between the smart devices 13 or the like from the smart devices 13 and delivers this conversational content. The smart device 13 is an example of the terminal apparatus used by the user.

A file shared by users, a log of the conversational content exchanged by the users through the chat server 12, and so on are stored in the file server 14. Because the file server 14 is connected to the network N2, the relay server 11, the chat server 12, and the smart device 13, which are connected to the network N1, cannot directly access the file server 14. The file server 14 can access the relay server 11, the chat server 12, and the smart device 13, which are connected to the network N1.

The file server 14 continuously inquires the relay server 11 of whether the request is received or not. If the relay server 11 receives the request, the request is acquired from the relay server 11 and processed. Further, the file server 14 sends a processing result of processing the request to the relay server 11. The smart device 13 sending the request can receive the processing result of processing the request from the relay server 11. As such, the request can be indirectly sent from the smart device 13 connected to the network N1 to the file server 14 connected to the network N2 through the relay server 11.

The relay server 11, the chat server 12, and the smart device 13, which are connected to the network N1, are mutually communicable. Further, the smart device 13, the file server 14, the MFP 16, the projector 17, and IWB 18, which are connected to the network N2, are mutually communicable. Referring to FIG. 1, the smart device 13 is an example of the terminal device operated by the user. Further, the MFP 16, the projector 17, and the IWB 18 are an example of the terminal apparatus operated by the user. The smart device 13 may be a device operable by the user such as a smartphone, a tablet terminal, a portable phone, a notebook personal computer (PC), or the like.

The information processing system 1 illustrated in FIG. 1 is an example. Various system structures can be exemplified depending on a use or a purpose. For example, the relay server 11, the chat server 12, and the file server 14 illustrated in FIG. 1 may be structured so that processes performed by the relay server 11, the chat server 12, and the file server 14 are distributed to multiple computers. Alternatively, the relay server 11 and the chat server 12 may be integrated into a single computer.

<Hardware Structure>
<<Computer>>

Figure 2:
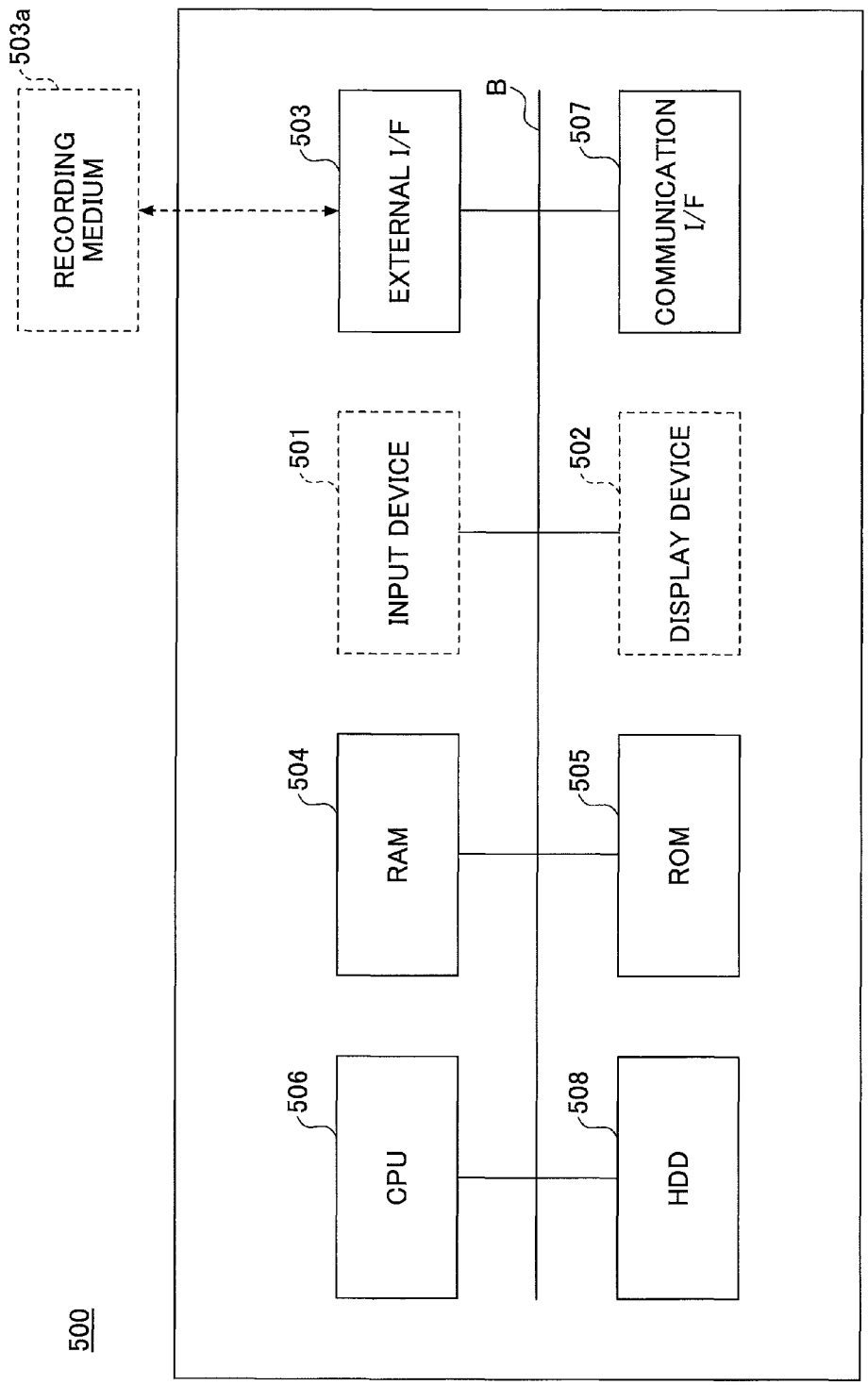
FIG. 2 illustrates an exemplary hardware structure of a computer of the embodiment.

The relay server 11, the chat server 12, and the file server 14 are substantialized by a computer having a hardware structure illustrated in, for example, FIG. 2. FIG. 2 illustrates an exemplary hardware structure of the computer of the first embodiment.

Referring to FIG. 2, the computer 500 includes an input device 501, a display device 502, an external I/F 503, a RAM 504, a ROM 505, a CPU 506, a communication I/F 507, a HDD 508, and so on, mutually connected by a bus B. As a possible configuration, the input device 501 and the display device 502 are connected when necessary.

The input device 501 includes a keyboard, a mouse, a touch panel, and so on, by which the user can input various operation signals. The display device 502 includes a display or the like, which displays a processing result obtained by the computer 500.

The communication I/F 507 is an interface provided to connect the computer 500 with the network N1 or N2. Thus, the computer 500 can perform data communications through the communication I/F 507.

The HDD 508 is a non-volatile memory device that stores programs and the data. The stored program and data are an operating system (OS), which is basic software controlling the entire computer 500, application software (hereinafter, simply referred to as an "application") providing various functions in the OS, and so on. The computer 500 may use a drive device using a flash memory (e.g., a solid state drive (SSD)) as a recording medium in place of the HDD 508.

The external I/F 503 is an interface with an external apparatus. The external apparatus is a recording medium 503a or the like. With this, the computer 500 can read information from the recording medium 503a and/or write information to the recording medium 503a through the external I/F 503. The recording medium 503a is a flexible disk, a CD, a DVD, an SD memory card, a USB memory, or the like.

The ROM 505 is a non-volatile semiconductor memory (a memory device), which can hold a program and/or data even when a power source is powered off. The ROM 505 stores programs and data such as basic input/output system (BIOS), OS setup, network setup, or the like, which are executed at a time of booting up the computer 500. The RAM 504 is an example of a volatile semiconductor memory (a memory device) temporarily storing the program and/or the data.

The CPU 506 reads the program and/or the data from the memory device such as the ROM 505, the HDD 508, or the like. The read program or the read data undergo a process to thereby substantialize a control or a function of the entire computer 500.

The relay server 11, the chat server 12, and the file server 14 can perform various processes described later by the hardware structure of the computer 500 illustrated in, for example, FIG. 2.

<Smart Device>

Figure 3:
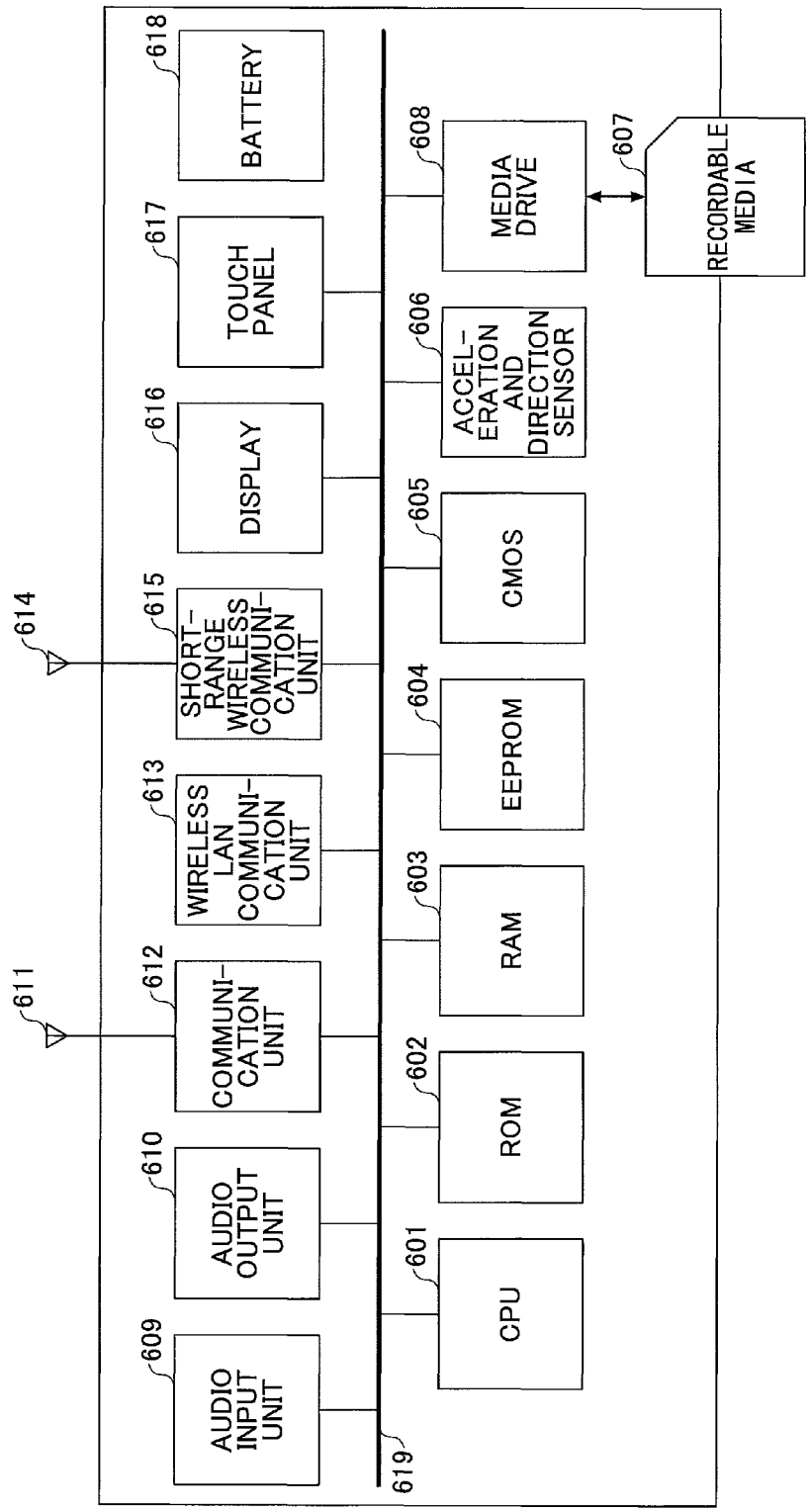
FIG. 3 illustrates an exemplary hardware structure of a smart device of the embodiment.

FIG. 3 illustrates an exemplary hardware structure of the smart device of the first embodiment. The smart device 13 illustrated in FIG. 3 includes a CPU 601, a ROM 602, a RAM 603, an EEPROM 604, a CMOS sensor 605, an acceleration and direction sensor 606, and a media drive 608.

The CPU 601 controls an operation of the entire smart device 13. The ROM 602 stores a basic input and output program. The RAM 603 is used as a work area of the CPU 601. The EEPROM 604 reads or writes data in conformity with a control of the CPU 601. The CMOS sensor 605 captures an object in conformity with the control of the CPU 601 to acquire image data. The acceleration and direction sensor 606 is an electromagnetic compass that detects earth magnetism, a gyrocompass, an acceleration sensor, or the like.

The media drive 608 controls read or write (store) of data from or to a record media 607 such as a flash memory. Data already recorded in the record media 607 are read out or new data are written in the record media 607. The record media 607 is freely attachable or detachable with respect to the media drive 608.

The EEPROM 604 stores an operating system (OS) executed by the CPU 601, association information necessary for a network setup, or the like. An application for performing various processes of the first embodiment is stored in the EEPROM 604, the recordable media 607, or the like.

The CMOS sensor 605 is a charge-coupled device that converts light to electric charges and digitizes an image of an object. The CMOS sensor 605 may be substituted by, for example, a charge coupled device (CCD) sensor as long as the image of the object can be captured.

Further, the smart device 13 includes an audio input unit 609, an audio output unit 610, an antenna 611, a communication unit 612, a wireless LAN communication unit 613, a short-range wireless communication antenna 614, a short-range wireless communication unit 615, a display 616, a touch panel 617, and a bus line 619.

The audio input unit 609 converts a sound to an audio signal. The audio output unit 610 converts the audio signal to the sound. The communication unit 612 uses the antenna 611 to communicate with the nearest base station apparatus by a wireless communication signal. The wireless LAN communication unit 613 performs a wireless LAN communication with an access point in conformity with the standard IEEE 80411. The short-range wireless communication unit 615 performs short-range wireless communication (Bluetooth, "Bluetooth" is a registered trademark) using the short-range wireless communication antenna 614.

The display 616 is provided to display the image of the object, various icons, or the like. The display 616 is made of a liquid crystal or an organic EL. The touch panel 617 is mounted on the display 616 and is formed of a panel of a pressure sensitive type or a static type. A touch position on the display 616 is detected by a touch of a finger or a touch pen. The bus line 619 is an address bus, a data bus, or the like for electrically connecting the above units and parts.

The smart device 13 includes a battery 618 for a dedicated use. The smart device 13 is driven by the battery 618. The audio input unit 609 includes a microphone for inputting the sound. The audio output unit 610 includes a speaker for outputting the sound.

As described, the smart device 13 of the first embodiment can substantialize various processes described later with the above hardware structure.

<Software Structure>
<<Smart Device>>

Figure 4:
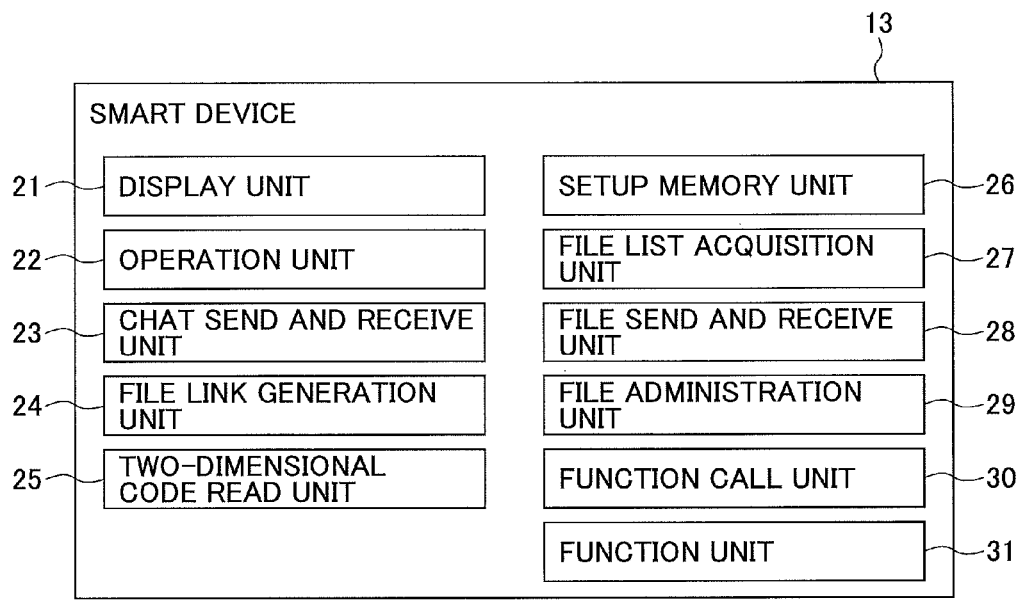
FIG. 4 is an exemplary processing block chart of a smart device of the embodiment.

The smart device 13 of the first embodiment is substantialized by the processing block illustrated in, for example, FIG. 4. FIG. 4 is an exemplary processing block chart of the smart device of the first embodiment. Referring to FIG. 4, the smart device 13 includes a display unit 21, an operation unit 22, a chat send and receive unit 23, a file link generation unit 24, a two-dimensional code read unit 25, a setup memory unit 26, a file list acquisition unit 27, a file send and receive unit 28, a file administration unit 29, a function call unit 30, and a function unit 31.

The display unit 21 displays the content of a file, the conversational content, and so on for the user. The operation unit 22 receives an operation from the user. The chat send and receive unit 23 sends and receives the conversational content of the chat. The file link generation unit 24 generates a file link 24. The two-dimensional code read unit 25 reads a two-dimensional code such as a QR code (the "QR code" is a registered trade mark). The setup memory unit 26 stores setups such as a user name, a password, a group, and so on.

The file list acquisition unit 27 acquires a file list stored in the file server 14. The file send and receive unit 28 sends and receives the file. The file administration unit 29 administrates the received file. The function call unit 30 calls a function other than the chat function when a "function calling character" described below is input as the conversational content (a message) of the chat. The "function calling character" of the first embodiment is not limited to a so-called letter and may include a number and a symbol. The function unit 31 provides the function other than the chat function (for example, a camera function or an upload function).

<<Chat Server>>

Figure 5:
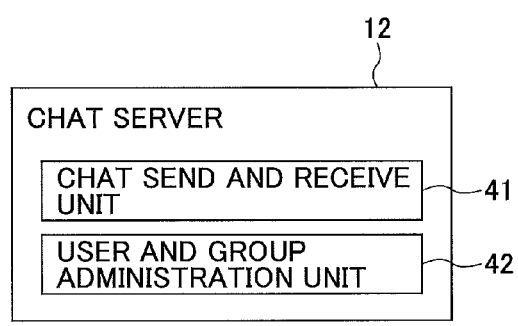
FIG. 5 is an exemplary processing block chart of a chat server of the embodiment.

The chat server 12 of the first embodiment is substantialized by the processing block illustrated in, for example, FIG. 5. FIG. 5 is an exemplary processing block chart of the chat server of the first embodiment. The chat server 12 executes the program to substantialize a chat send and receive unit 41 and a user and group administration unit 42. The chat send and receive unit 41 receives the conversational content sent from one of the smart devices 13 and sends the conversational content to another smart device 13 in the same group. The user and group administrating unit 42 administrates the user participating in the chat and a group to which the conversation content of the chat is sent. The chat server 12 provides the chat function to the smart device 13.

<<Relay Server>>

Figure 6:
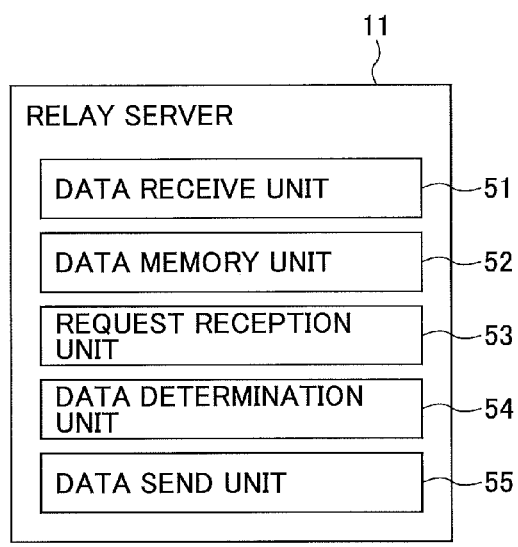
FIG. 6 is an exemplary processing block chart of a relay server of the embodiment.

The relay server 11 of the first embodiment is substantialized by the processing block illustrated in, for example, FIG. 6. FIG. 6 is an exemplary processing block chart of the relay server of the first embodiment. For example, the relay server 11 substantializes a data receive unit 51, a data memory unit 52, a request reception unit 53, a data determination unit 54, and a data send unit 55 by running a program.

The data receive unit 51 receives data such as the conversational content or the file received from the smart device 13 connected to the network N1, a smart device ID of a transmission source of the data, and a file server ID of a transmission destination from the smart device 13 connected to the network N1. The data memory unit 52 stores various data received by the data receive unit 51 while correlating the data. The request reception unit 53 receives an inquiry of whether there is a request from the file server 14.

The data determination unit 54 determines whether the data associated with the file server ID of the file server 14, for which the request reception unit 53 receives an inquiry, are stored. When the data determination unit 54 determines that the data associated with the file server ID of the file server 14, for which the request reception unit 53 receives the inquiry, are stored, the data send unit 55 sends the data to the file server 14.

<<File Server>>

Figure 7:
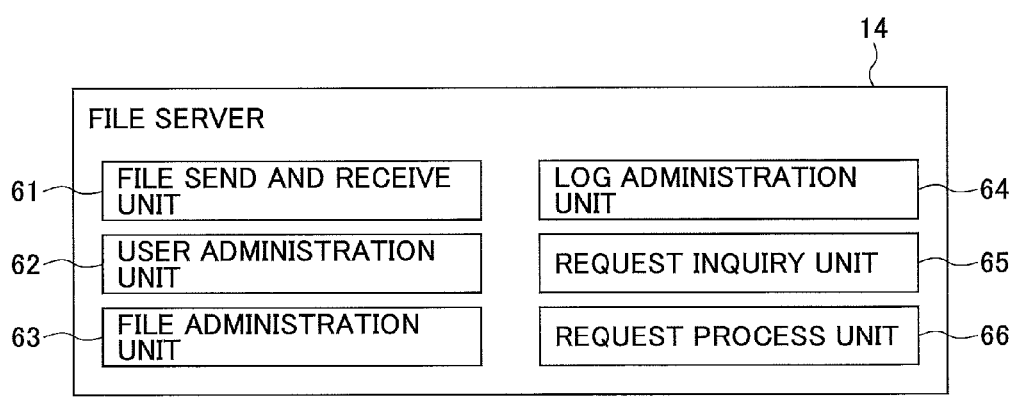
FIG. 7 is an exemplary processing block chart of a file server of the embodiment.

The file server 14 of the first embodiment is substantialized by a processing block illustrated in, for example, FIG. 7. FIG. 7 is an exemplary processing block chart of the file server of the first embodiment. The file server 14 substantializes a file send and receive unit 61, a user administration unit 62, a file administration unit 63, a log administration unit 64, a request inquiry unit 65, and a request process unit 66 by executing a program. The file send and receive unit 61 sends or receives the file to or from the smart devices 13. The user administration unit 62 performs a user authentication.

The file administration unit 63 stores the received file or reads the stored file. The log administration unit 64 administrates the conversational content of the chat as a log. The request inquiry unit 65 inquires the relay server of whether a request to the relay server 11 exists or not. The request process unit 66 processes the request based on the content of the request.

<Detailed Process>

Hereinafter, a detailed process of the information processing system 1 of the first embodiment is described.

<<Apparatus Registration>>

In the information processing system 1 of the first embodiment, it is necessary to register an accessible smart device 13 to the file server 14. For example, in the information processing system 1, the smart device 13 accessible to the file server 14 is registered (pairing) using a two-dimensional code as follows.

Figure 8:
FIG. 8 illustrates an exemplary image of a WebUI displaying a two-dimensional code.

FIG. 8 illustrates an exemplary image of a WebUI displaying the two-dimensional code. On the WebUI illustrated in FIG. 8, the two-dimensional code such as the QR code (the "QR code" is a registered trade mark) is displayed. The user causes the smart device 13, which is required to be registered as the smart device 13 accessible to the file server 14, to read the two-dimensional code displayed on the WebUI.

Figure 9:
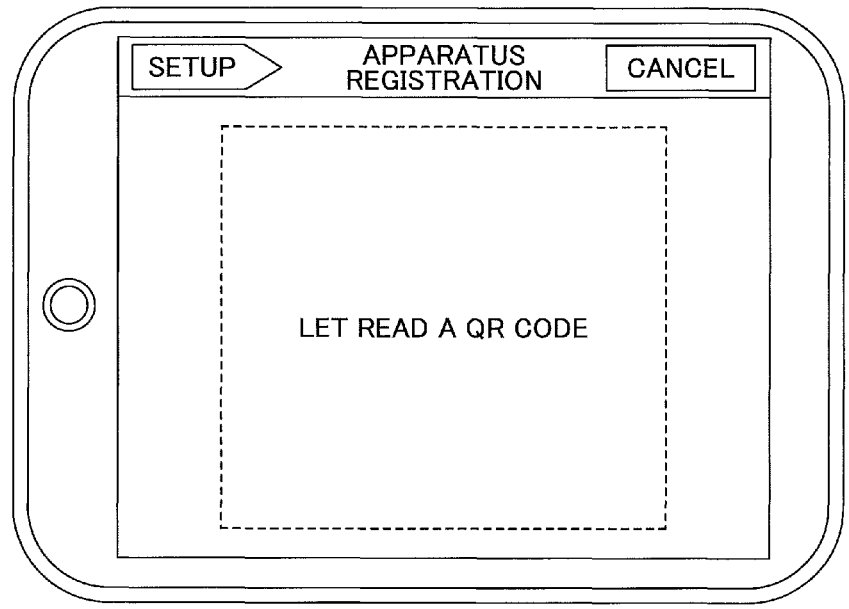
FIG. 9 illustrates an exemplary image of a screen by which the two-dimensional code is read.

FIG. 9 illustrates an exemplary image of a screen by which the two-dimensional code is read. It is possible to cause the smart device 13 to read the captured two-dimensional code by adjusting the position of the smart device 13 so that the two-dimensional code is displayed inside a broken line on the screen illustrated in FIG. 9. The registration of the smart device 13 is performed regardless of whether the smart device accesses through the relay device 13. The smart device 13 can acquire information necessary for accessing the file server 14 as illustrated in FIG. 10 by reading the two-dimensional code.

The WebUI illustrated in FIG. 8 may access an information processing apparatus such as the file server 14 from the terminal apparatus such as the file server 14. Further, the two-dimensional code may be printed out.

FIG. 10 illustrates an exemplary structure of information acquired from the two-dimensional code. For example, FIG. 10 illustrates exemplary information necessary to access the file server. Referring to FIG. 10, an ID and an IP address each inherent in the file server 14, an ID used when the access is through the relay server 11, and a link used for activation are included.

Figure 11:
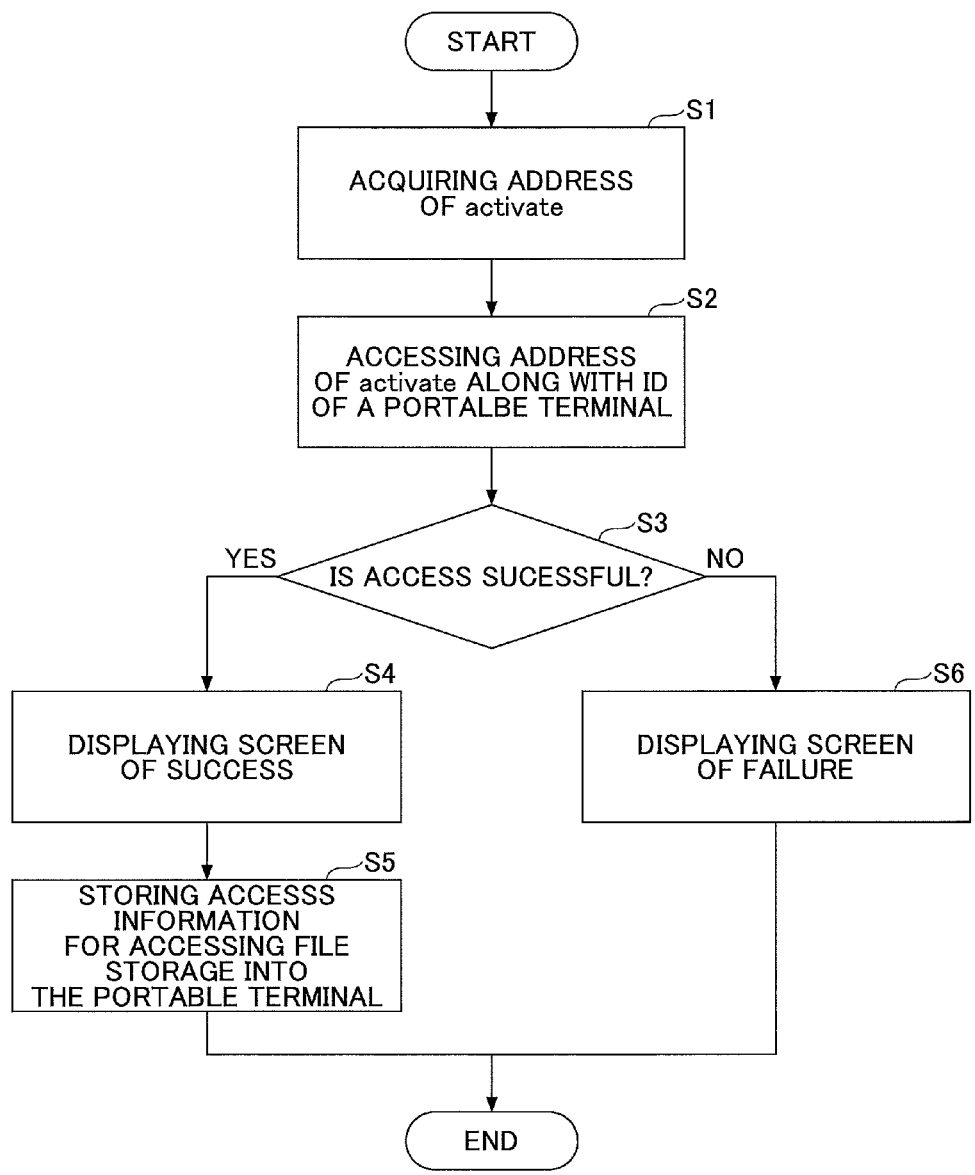
FIG. 11 is an exemplary flow chart of a smart device registration process of registering a smart device.

FIG. 11 is an exemplary flow chart of registering the smart device. In step S1, the smart device 13 acquires a link used for an activation (see FIG. 10) which is read from the two-dimensional code as illustrated in FIG. 8. In step S2, the smart device 13 accesses a link (an address of the activation) while sending the smart device ID.

In step S3, the smart device 13 determines whether the registration to the file server 14 is completed by accessing the link used for the activation. In a case where the registration to the file server 14 is completed after accessing the link used for the activation, the smart device 13 displays a screen of success as illustrated in FIG. 12 in step S4.

Figure 12:
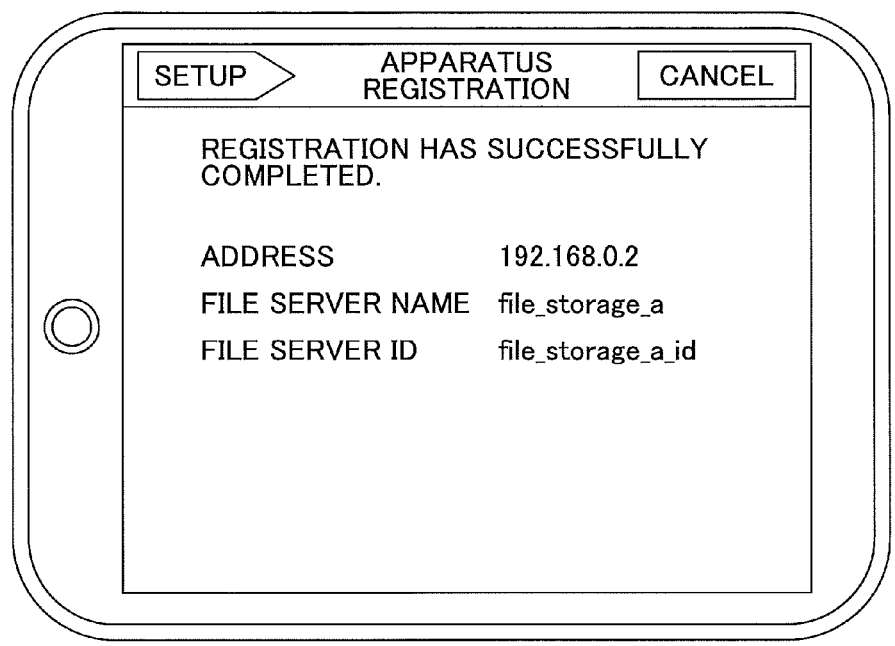
FIG. 12 illustrates an exemplary image of a screen of success.

FIG. 12 illustrates an exemplary image of the screen of the success. The registration of the smart device 13, and the IP address, the file server name, and the file server ID of the file server, in which the smart device 13 is registered, are displayed on the screen of the success illustrated in FIG. 12. In step S5 after step S4, the smart device 13 stores information (access information for the file server 14) necessary for accessing the file server 14. In a case where the registration to the file server 14 fails in step S3, the smart device 13 displays a screen of failure in step S6.

The flow chart illustrated in FIG. 11 is provided to perform the activation based on the address of the activation acquired from the two-dimensional code, register the information of the smart device 13 to the file server 14, and register the information of the file server 14 to the smart device 13.

The file server 14 does not permit an access from the smart device which does not perform a smart device registration process illustrated in FIG. 11. When the file server 14 is used from the smart device 13, it is necessary to perform a smart device registration process illustrated in FIG. 11. The smart device 13 completing the smart device registration process can take out the information and the file stored in the file server 14. Because the smart device ID inherent in the smart device 13 is registered by the smart device registration process, the file server can prevent "spoofing" by another smart device 13.

<<Chat Process>>

In the information processing system 1 of the first embodiment, the chat is conducted between the smart devices 13 participating in the group. The user selects the group, in which the chat is conducted, from a group selection screen and pushes a button named "start of conversation". The information of the groups displayed on the group selection screen can be acquired from the chat server 12. When the button of "start of conversation" is pushed, the smart device 13 reports the group, in which the chat is performed, selected from the group selection screen to the chat server 12. Hereinafter, the smart device operated by a user A is called a smart device 13A, and the smart device 13 operated by a user B is called a smart device B.

Figure 13:
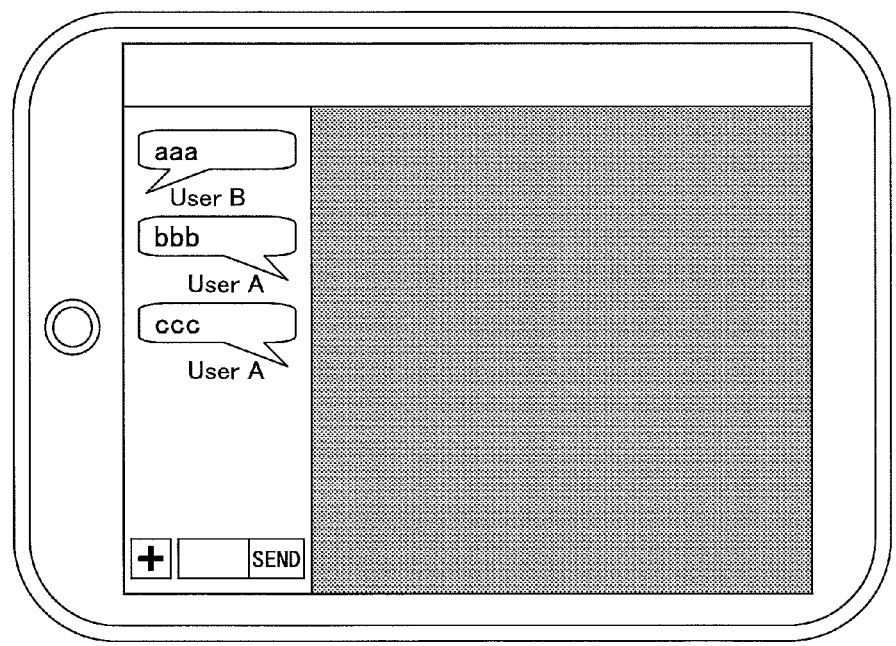
FIG. 13 illustrates an exemplary image of a chat screen.

The user A operates the smart device 13A, selects the group, in which the chat is conducted, and pushes the button of "start of conversation". The smart device 13A acquires a log of the selected group from the file server 14. This acquired log is a log of the conversational content of the chats exchanged in the selected group by the present time. The chat screen illustrated in FIG. 13 is displayed on the smart device 13A. FIG. 13 illustrates an exemplary image of the chat screen.

On the chat screen, the conversational content of the chats is displayed on the left side and an entry field is arranged below an area of displaying the conversational content. The smart device 13A displays logs of the conversational contents acquired from the file server 14 by the present time on the left side of the chat screen illustrated in, for example, FIG. 13.

Figures 14, 15:
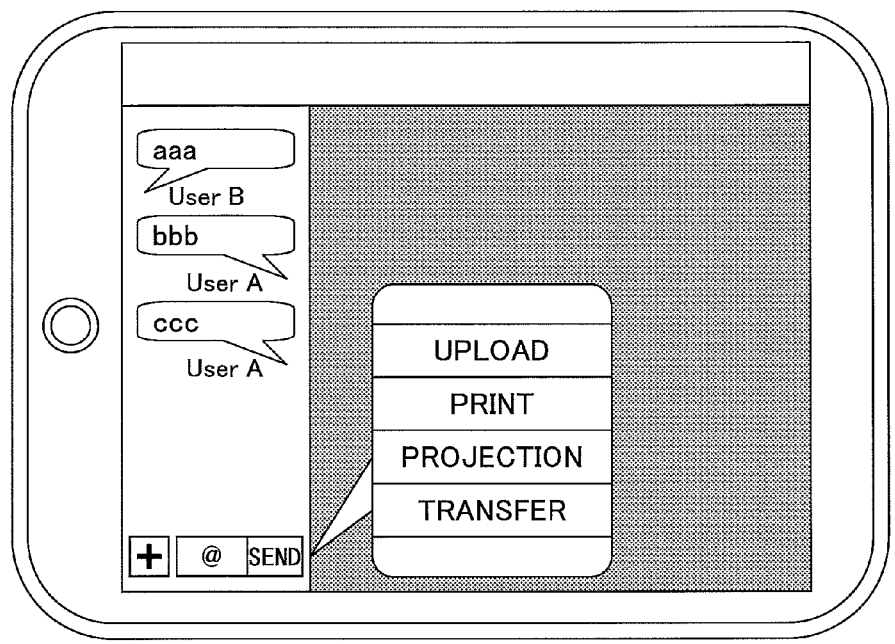
FIG. 14 illustrates an exemplary image of a chat screen on which a function view is displayed.
FIG. 15 illustrates an exemplary structure of a function classification table.

For example, the user A operates the smart device 13A and inputs the "function calling character" of "@" into an entry field arranged in a lower left area of the chat screen illustrated in FIG. 13. Thus, a function view (at least one function displayed in a view format) illustrated in, for example, FIG. 14 is displayed. Here, the "function calling character" is not limited to a single character and may be formed by multiple characters.

FIG. 14 illustrates an exemplary image of the chat screen on which the function view is displayed. Referring to FIG. 14, upload, print, projection, and transfer are displayed as the function view. The function view can be displayed by using a function classification table as illustrated in, for example, FIG. 15.

FIG. 15 is an exemplary structural view of a function classification table. The function classification table illustrated in FIG. 15 includes a large classification of the functions (hereinafter, referred to as a function large classification) and a small classification of the functions (hereinafter, referred to as a function small classification) as items. The function classification table can be classified not only to the function large classification and the function small classification but also to a function large classification, a function middle classification, and a function small classification and to the other various classifications.

In the function classification table of the function classification table illustrated in FIG. 15, upload, print, projection, and transfer functions are included. At least one function corresponds to the function small classification based on the functions classified by the corresponding function large classification.

The function small classifications of "camera" and "album" correspond to the function large classification of "upload". The function small classification of "camera" represents an upload function of uploading a file of a photo shot by the camera function to the file server 14. The function small classification of "album" represents the upload function of uploading a file stored by the album function to the file server 14.

The function small classifications of "IP print" and "two-dimensional code read" correspond to the function large classification of "print". The function small classification of "IP print" represents a function of receiving an input of the IP address from the user and causing a print apparatus such as the MFP 16 designated by the input IP address to print. The function small classification of "two-dimensional code read" represents a function of reading a two-dimensional code designating the print apparatus such as the MFP 16 and causing the print apparatus such as the MFP 16 designated by the two-dimensional code to print.

The function small classifications of "IP projection" and "two-dimensional code read" correspond to the function large classification of "projection". The function small classification of "IP projection" represents a function of receiving an input of the IP address from the user and causing a projection apparatus such as the projector 17 designated by the input IP address to project. The function small classification of "two-dimensional code read" represents a function of reading the two-dimensional code designating a projection apparatus such as the projector 17 and causing the projection apparatus such as the projector 17 designated by the two-dimensional code to project.

The function small classifications of "FAX" and "inter application cooperation" correspond to the function large classification of "transfer". The function small classification of "FAX" has a function of transferring the file by a FAX function. The function small classification of "inter application cooperation" represents a function of transferring the file by a function of making files cooperate between applications, such as an OpenIn function.

The function classification table illustrated in FIG. 15 is an example of functions which can be called by inputting the "function calling character" into the entry field arranged on the lower left area of the chat screen. For example, the function view displayed on the chat screen illustrated in FIG. 14 corresponds to a view of the functions included in the function large classification of the function classification table illustrated in FIG. 15.

Figure 16:
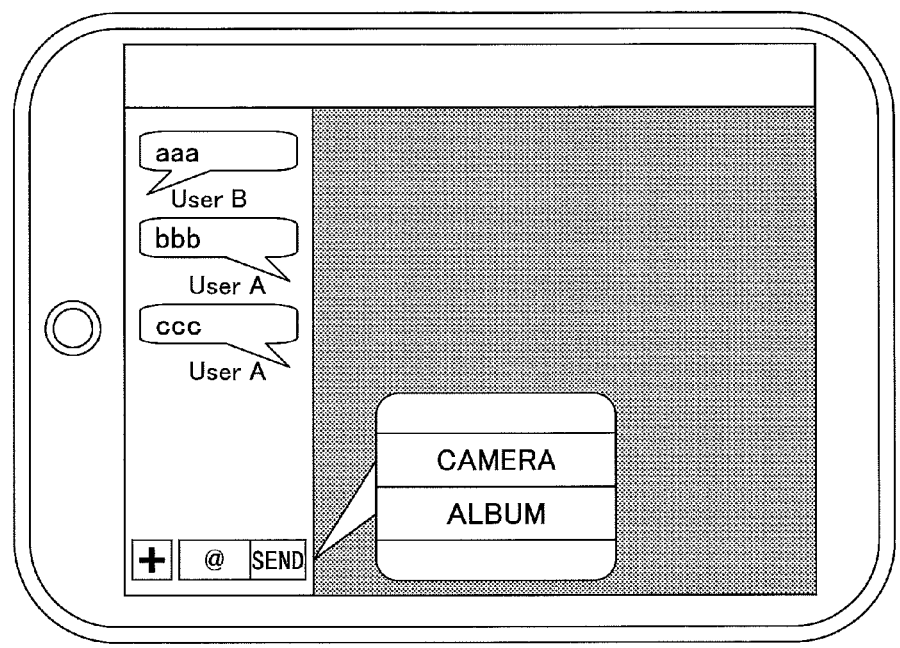
FIG. 16 illustrates an exemplary image of a chat screen on which a function view of a function small classification is displayed.

When one function (e.g., upload) is selected from the function view illustrated in FIG. 14, the chat screen is updated to be a function view illustrated in FIG. 16. FIG. 16 illustrates an exemplary image of the chat screen on which a function view of the function small classification is displayed. In the function view illustrated in FIG. 16, the functions (for example, camera and album) of the function small classification corresponding to one function (for example, upload) of the function large classification selected from the function view illustrated in FIG. 14 by the user.

Figure 17:
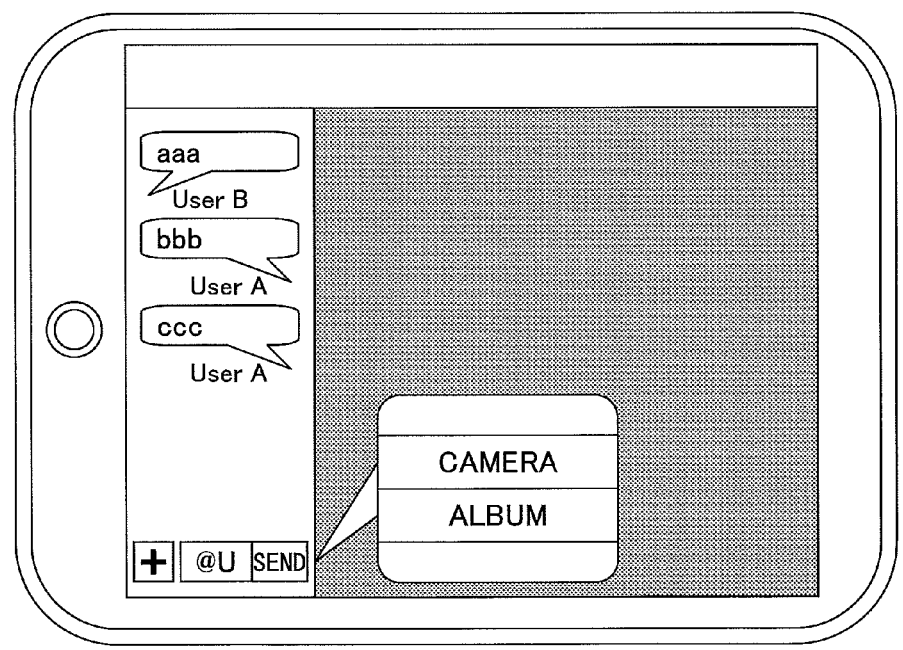
FIG. 17 illustrates another exemplary image of a chat screen on which a function view of a function small classification is displayed.

Instead of selecting "upload" from the function view, the user can perform a process similar to a case where "upload" is selected from the function view by inputting "U" after "@" being the "function calling character" in the entry field as illustrated in FIG. 17. FIG. 17 illustrates another exemplary image of the chat screen on which the function view of the function small classification is displayed.

Figure 18:
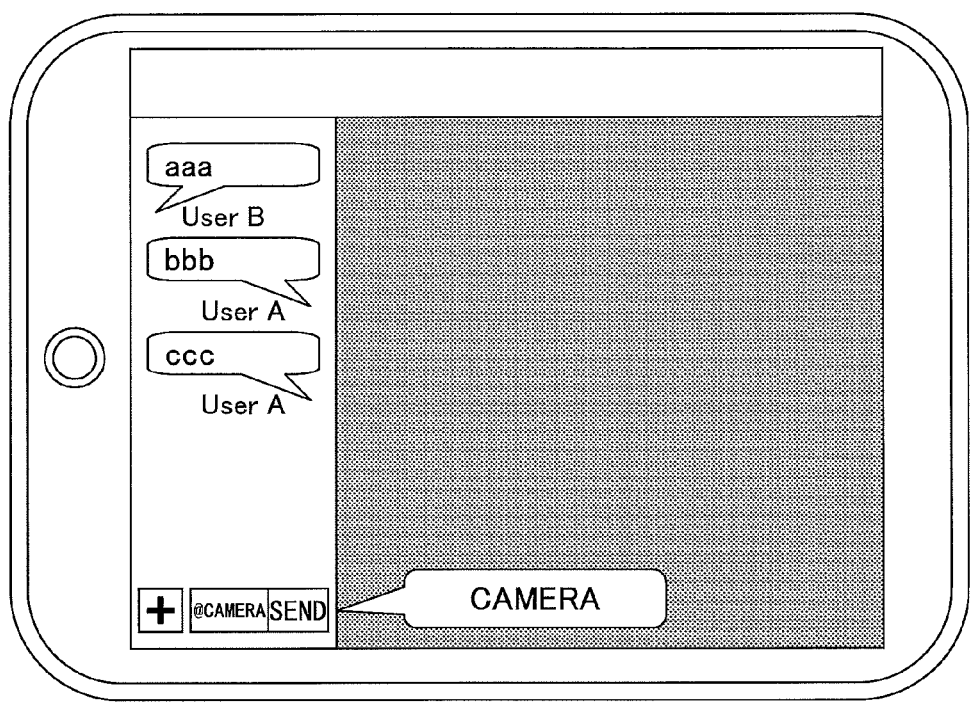
FIG. 18 illustrates another exemplary image of the chat screen on which the function view of the function small classification is displayed.

Further, when the user operates the smart device 13A and inputs "@camera" including the "function calling character" into the entry field arranged in the lower left area of the chat screen illustrated in FIG. 18, the function view of the function large classification and the function view of the function small classification can be omitted and the corresponding function can be directly displayed. The function of "camera" of the function small classification is directly displayed on the chat screen illustrated in FIG. 18.

When a "send" button arranged on the right side of the entry field on the chat screens illustrated in FIGS. 14, 16, 17, and 18 is pushed, a character and a character string which include the "function calling character" and input into the entry field are sent to the chat server 12 as a message.

Figure 19:
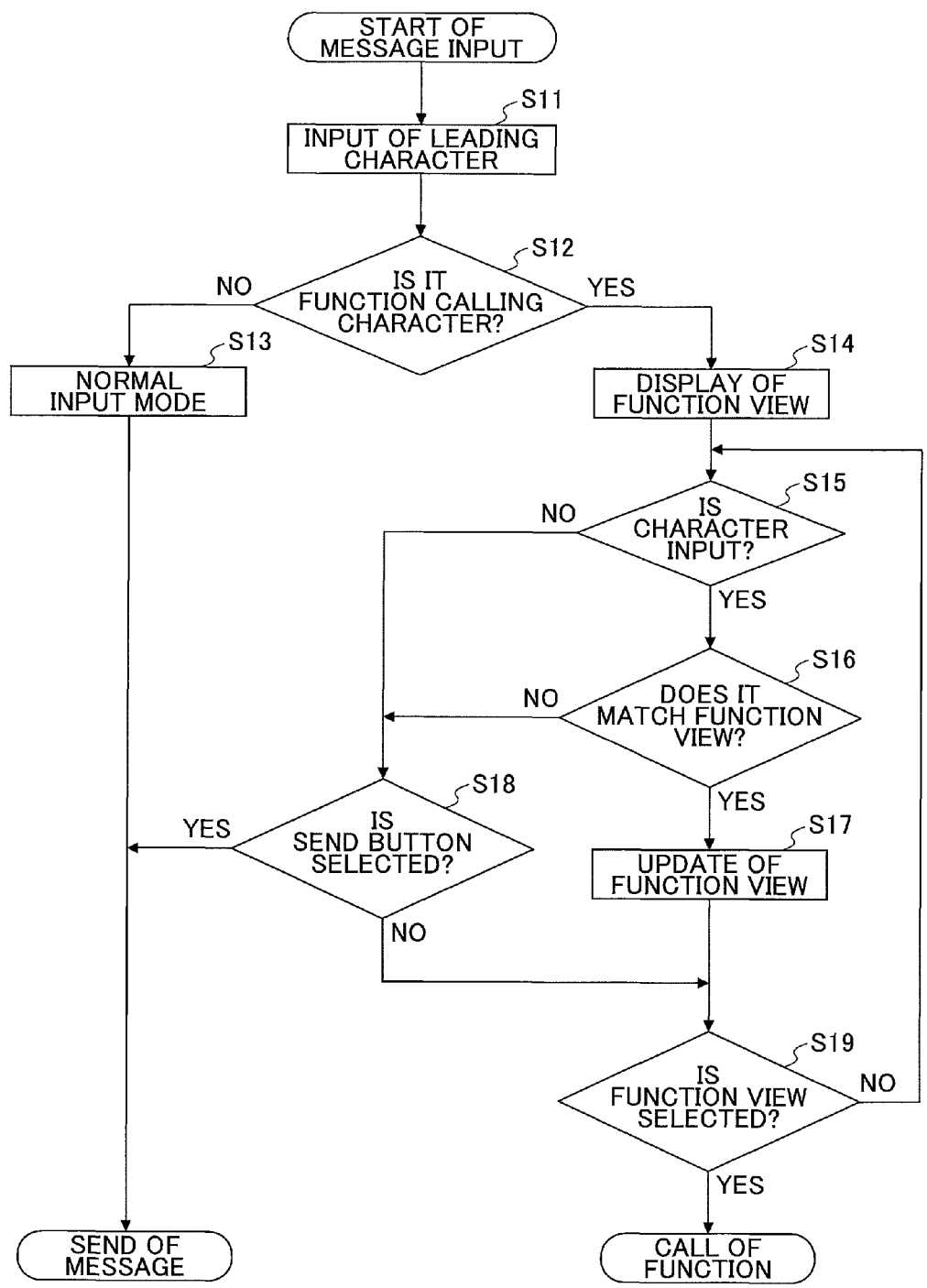
FIG. 19 is an exemplary flow chart of a function call determining process.

When the character is input into the entry field arranged in the lower left area of the chat screen of the smart device 13, the smart device 13 starts processing the flow chart illustrated in FIG. 19. FIG. 19 is an exemplary flow chart of a function call determining process.

In step S11, the operation unit 22 of the smart device 13 receives an input of a leading character in step S11. In step S12, the function call unit 30 determines whether a leading character input by the user 30 is the "function calling character" or not.

If the character is not the "function calling character", the function call unit 30 proceeds to step S13 and determines a normal input mode. Then, the function view is not displayed. When the "send" button is pushed, the chat send and receive unit 23 sends the character or the character string input into the entry field to the chat server 12 as the message.

If the input character is the "function calling character", the function call unit 30 proceeds to step S14, uses a function classification table illustrated in FIG. 15, and displays the function view illustrated in, for example, FIG. 14. When a next character is received from the user (YES of step S15), the function call unit 30 proceeds to step S16 and the next character can narrow down the name of the function of the function classification table (match the function classification table) or not. If the next character can narrow down the function of the function classification table (YES of step S16), the function call unit 30 proceeds to step S17 and updates the function view so as to show the narrowed down functions.

In step S17, as illustrated in, for example, FIG. 17 or FIG. 18, the function view is updated to display the function narrowed down by the character or the character string following "@".

When the "send" button is pushed (YES of step S15) while the chat send and receive unit 23 does not receive the input of the next character by the user (NO of step S15), the character or the character string input into the entry field is sent to the chat server 12 as a message.

If the next character cannot narrow down the function of the function classification table (NO of step S16) and when the "send" button is pushed (YES of step S18), the character or the character string input into the entry field is sent to the chat server 12 as the message. When the "send" button is not pushed (NO of step S18), the function call unit 30 determines whether a function is selected by the user from the function view in step S19.

If the function is selected by the user from the function view (YES of step S19), the function call unit 30 performs a function calling process of calling the function selected by the user. Meanwhile, if the function is not selected by the user from the function view (NO of step S19), the process goes back to step S15 and the function call unit 30 performs the process of the flow chart illustrated in FIG. 19. Although the process of the flow chart illustrated in FIG. 19 is a case where the "function calling character" is input as the leading character, the "function calling character" may be other than the leading character.

Figure 20:
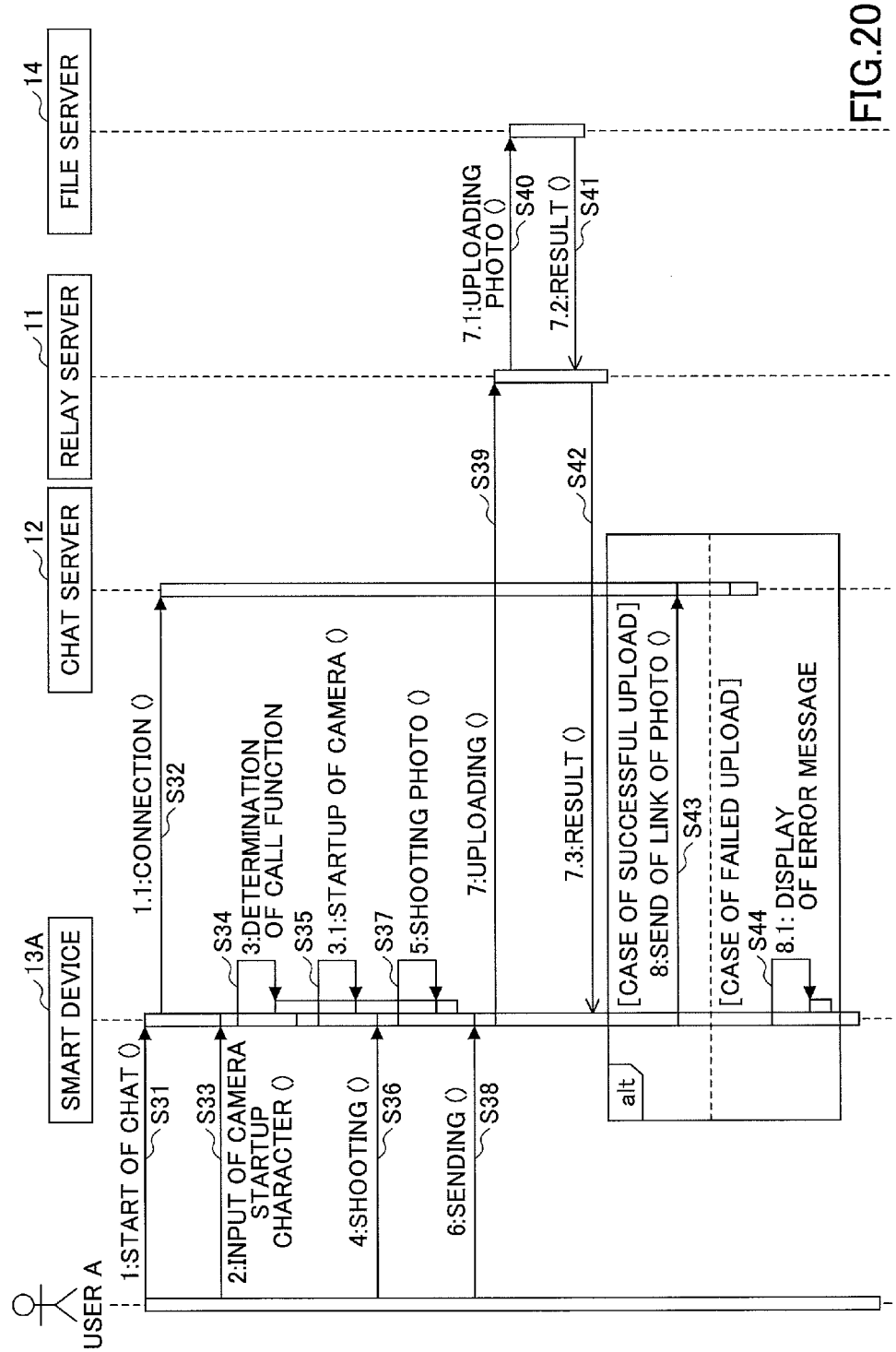
FIG. 20 is an exemplary sequence chart of a function calling process.

FIG. 20 is an exemplary sequence chart of a function calling process. Referring to FIG. 20, illustrated is an exemplary function of uploading a photo shot by a camera to the file server 14 and delivering a link to the photo as a message of the chat.

In step S31, the user A operates the smart device 13A and instructs to start the chat. The operation unit 22 of the smart device 13A receives an instruction of starting the chat by the user A. In step S32, the chat send and receive unit 23 of the smart device 13A is connected to the chat server 12. Further, the display unit 21 of the smart device 13A displays the chat screen illustrated in, for example, FIG. 13.

In step S33, the user A operates the operation unit 22 of the smart device 13A and inputs "@" of the camera startup character into the entry field of the chat screen as illustrated in, for example, FIG. 18. In step S34, the function call unit 30 of the smart device 13A determines that a call function is the function of "camera" corresponding to a camera startup character of "@camera" input into the entry field 30.

Figure 21:
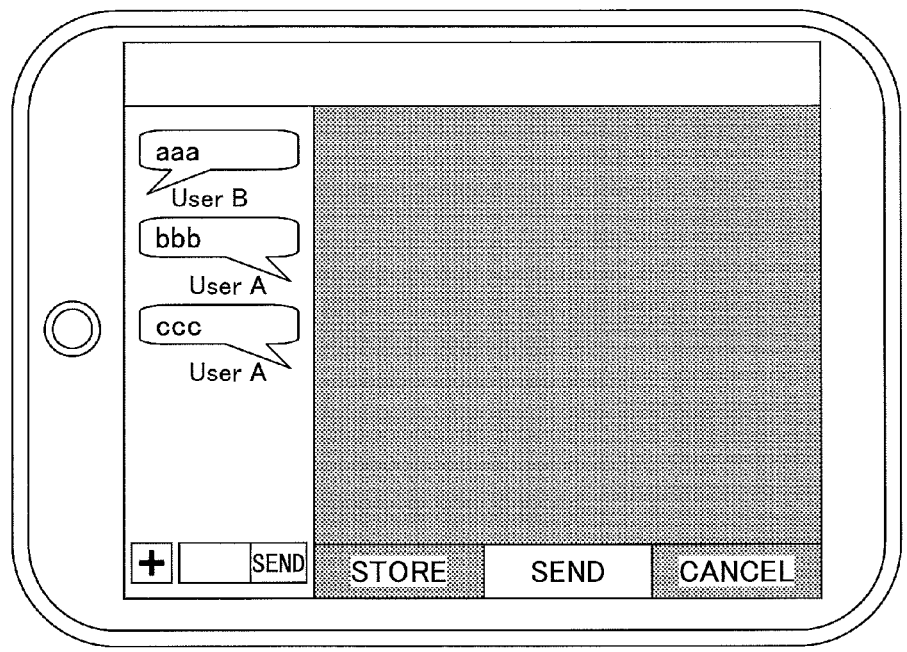
FIG. 21 illustrates an exemplary image of a chat screen on which a UI of a function of "camera" is displayed.

In step S35, the function call unit 30 causes the function unit 31 corresponding to the function of "camera" to start up. A UI of the function of "camera" is displayed on the right side of the chat screen as illustrated in, for example, FIG. 21. FIG. 21 illustrates an exemplary image of a chat screen on which the UI of the function of "camera" is displayed.

In step S36, the user A operates the operation unit 22 of the smart device 13A to instruct to shot a photo. In step S37, the function unit 31 corresponding to the function of "camera" of the smart device 13A shoots the photo. The shot photo is displayed in the UI of the function of "camera".

In step S38, the user uploads the photo by performing an operation of pushing the "send" button displayed on the UI of the function of "camera". In steps S39 and S40, the function unit 31 corresponding to the function of "camera" uses the file send and receive unit 28 to upload a file of the photo to the file server 14 through the relay server 11.

In step S41 and S42, the function unit 31 corresponding to the function of "camera" of the smart device 13A receives a result of uploading the photo. If the result of uploading the photo is successful, the process goes to step S43 and the function unit 31 corresponding to the function of "camera" causes the file link generation unit 24 to generate a link of the file of the uploaded photo.

The function unit 31 corresponding to the function of "camera" transfers the generated link of the file of the photo (the link of the photo) to the chat send and receive unit 23 as the message of the chat. The chat send and receive unit 23 sends the link of the photo as the chat message to the chat server 12. The chat server 12 can deliver the link of the photo to the smart device 13 participating in the chat.

Figure 22:
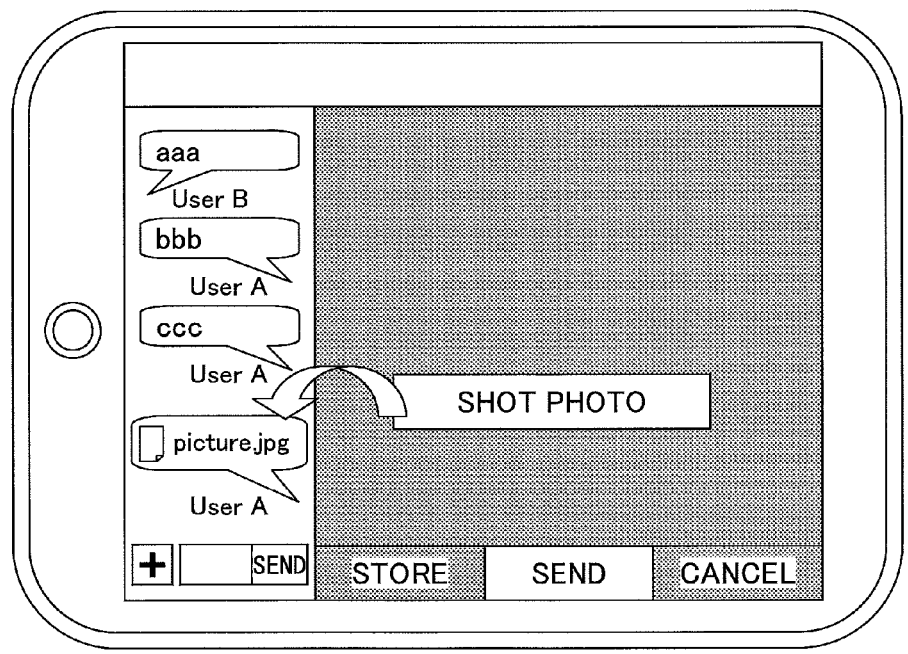
FIG. 22 illustrates an exemplary image of a chat screen on which a link of a photo is displayed as a message.

The smart device 13, to which the link of the photo is delivered, can display the link of the photo as the message on the left side of the chat screen as illustrated in FIG. 22. FIG. 22 illustrates an exemplary image of the chat screen on which the link of the photo is displayed as the message.

If the result of uploading the photo is failed, the process goes to step S44 and the function unit 31 corresponding to the function of "camera" causes the UI of the function of "camera" to display an error message to report the failure of the upload of the photo to the user.

Figure 23:
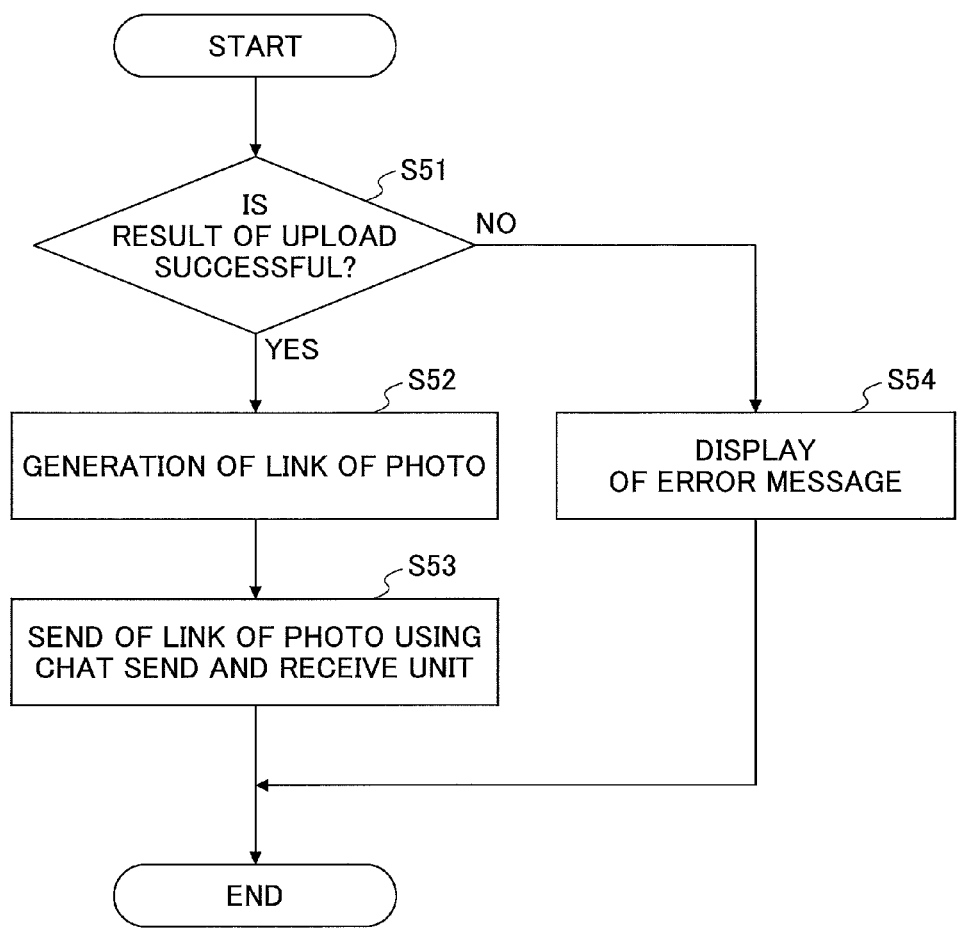
FIG. 23 is an exemplary flow chart of a process based on a result of uploading the photo.

The function unit 31 corresponding to the function of "camera", which receives the result of uploading the photo performs a process based on the result of uploading the photo illustrated in, for example, FIG. 23. FIG. 23 is an exemplary flow chart of the process based on the result of uploading the photo.

In step S51, the function unit 31 corresponding to the function of "camera" determines whether the result of uploading the photo is successful. If the result of uploading the photo is successful, the process goes to step S52 and the function unit 31 corresponding to the function of "camera" causes the file link generation unit 24 to generate a link of the file of the uploaded photo. Then, the process goes to step S53 and the function unit 31 corresponding to the function of "camera" transfers the link of the photo to the chat send and receive unit 23. The chat send and receive unit 23 sends the link of the photo as the chat message to the chat server 12.

If the result of uploading the photo is failed (NO of step S51), the process goes to step S54 and the function unit 31 corresponding to the function of "camera" causes the UI of the function of "camera" to display the error message to report the failure of uploading the photo to the user.

Figure 24:
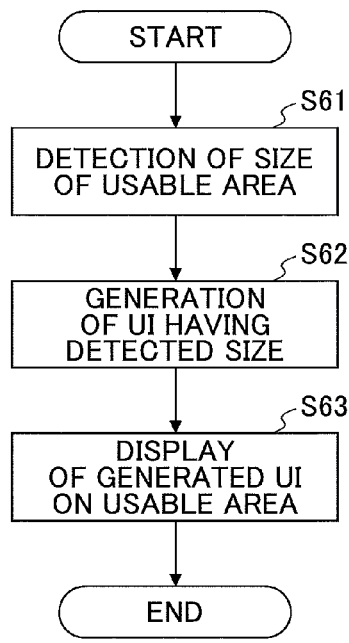
FIG. 24 is an exemplary flow chart of a process of displaying the UI of the function of "camera" on a part of the chat screen.

Further, the process of displaying the UI of the function of the "camera" on the right side of the chat screen is performed as illustrated in, for example, FIG. 24. FIG. 24 is an exemplary flow chart of a process of displaying the UI of the function of "camera" on a part of the chat screen.

In step S61, in a case where the chat screen is as illustrated in, for example, FIG. 13, the function unit 31 corresponding to the function of "camera" detects a size of a usable area (an area on the right side of FIG. 13) except for the area on the left side where the conversational content of the chat is displayed.

In step S62, the function unit 31 corresponding to the function of "camera" generates the UI of the function of the "camera" detected in step S61. An existing techniques is applicable to a process of generating the UI having the detected size. The process goes to step S63, and the function unit 31 corresponding to the function of "camera" displays the UI of the function of "camera" in the usable area (except for the area in which the conversational content of the chat is displayed) like the chat screen illustrated in, for example, FIG. 21.

<Another Exemplary System Structure>

Figure 25:
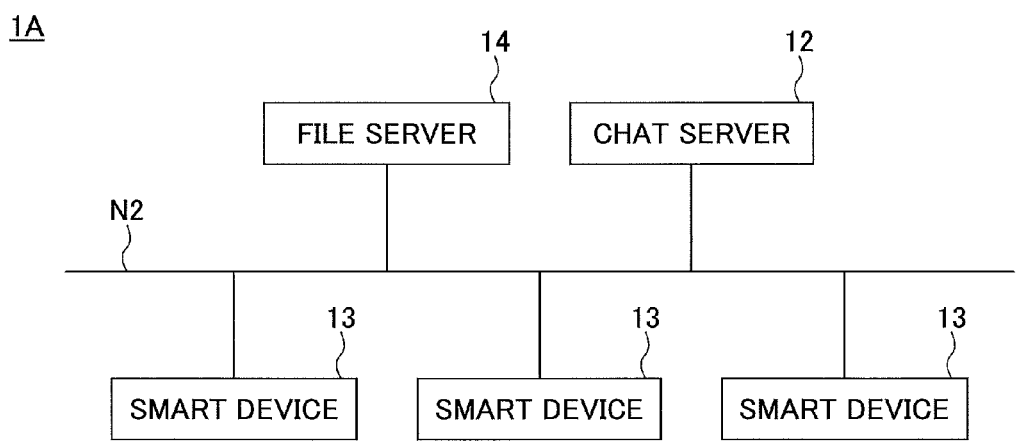
FIG. 25 illustrates another exemplary structure of the information processing system of the embodiment.

The structure of the information processing system 1 is an example and may be as illustrated in FIG. 25. FIG. 25 illustrates another exemplary structure of the information processing system of the first embodiment.

In an information processing system 1A illustrated in FIG. 25, a chat server 12, multiple smart devices 13, and a file server 14 are connected to a network N2 such as a LAN. Because the information processing system 1A illustrated in FIG. 25 does not communicate beyond the FW 15, the relay server 11 is omitted. By the information processing system 1A illustrated in FIG. 25, a process similar to that in the above information processing system 1 can be performed. In the information processing system 1A illustrated in FIG. 25, the chat server 12 and the file server 14 may be integrated.

[General Overview]

As described, within the first embodiment, a function other than the chat function can be called and displayed in a part of an area of the chat screen by inputting the "function calling character" into the chat screen without closing the chat screen. Therefore, within the first embodiment, the operation flows are reduced and the operations become less burdensome because the function other than the chat function can be called from the chat screen on which the conversational content of the chat can be displayed.

The smart device 13 is an example of a terminal device. The chat server 12 is an example of an information processing apparatus which sends a message received from one terminal apparatus to the multiple terminal apparatuses. The file server 14 is an example of an information processing apparatus which stores data received from one terminal apparatus.

The chat screen is an example of a screen for using one function. The operation unit 22 is an example of an operation unit. The function call unit 30 is an example of a function call unit. The function unit 31 is an example of a function unit. The chat send and receive unit 23 is an example of a message send unit. The chat send and receive unit 41 is an example of a send and receive unit.

The embodiment does not limit the scope of the present invention. The present invention is not limited to the structures illustrated in FIGS. 1 and 25. For example, the relay server 11, the chat server 12, and the file server 14 of the information processing system 1 may be structured by at least one computer. As long as the above function can be performed, any computer has the function.

For example, the chat server 12 and the file server 14 of the information processing system 1A may be structured by at least one computer. As long as the above function can be performed, any computer has the function.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although a terminal apparatus has been described in detail, it should be understood that various changes, substitutions, and alterations could be made thereto without departing from the spirit and scope of the invention.

This application is based upon and claims the benefit of priority of the prior Japanese Patent Application No. 2014-105225, filed on May 21, 2014, the entire contents of which are incorporated herein by reference.

What is claimed is:

1. A terminal apparatus having a plurality of functions, the terminal apparatus comprising:
   a processor; and
   a memory storing instructions to be executed by the processor, the execution of the instructions causing the processor to perform processes of:
      receiving an input from a user of at least one of a character, a number, and a symbol into an entry field, the entry field being provided on a screen for using one function among the plurality of functions;
referring to a function classification table that includes classification information of available functions to be called from among the plurality of functions when the input of the at least one among the character, the number, and the symbol includes the character, the number, or the symbol for calling any function among the plurality of functions;
displaying a function selection view on the screen for using the one function, the function selection view displaying the available functions that are selectable by the user, and accepting a selection by the user of one available function from among the displayed available functions;
performing a function calling process of calling the selected available function from among the available functions indicated in the function classification table; and
changing the screen for using the one function to a screen for using the selected available function that has been called to display an error notification using a user interface of the selected available function in the case where an error occurs in performing processes of the selected available function that has been called.

2. The terminal apparatus according to claim 1, wherein the processor causes the display unit to display the selected available function, which can be called, in a view format.

3. The terminal apparatus according to claim 1, wherein the classification information is formed by associating the at least one among the character, the number, and the symbol with the selected available function, which can be called,
wherein the processor updates, when there is a change in the input of at least one among the character, the number, and the symbol input into the entry field, the selected available function, which can be called and displayed in the display unit, based on the classification information.

4. An information processing system comprising:
a plurality of terminal apparatuses, each terminal apparatus of the plurality of terminal apparatuses having a plurality of functions;
a first information processing apparatus that stores data received from one terminal apparatus from among the plurality of terminal apparatuses; and
a second information processing apparatus that sends a message, received from the one terminal apparatus, to the plurality of terminal apparatuses, wherein the one terminal apparatus includes
a first processor; and
a first memory storing instructions to be executed by the processor, the execution of the instructions causing the processor to perform processes of:
receiving an input from a user of at least one among a character, a number, and a symbol into an entry field, which is provided on a screen for using one function among the plurality of functions;
referring to a function classification table that includes classification information of available functions to be called from among the plurality of functions when the input of the at least one among the character, the number, and the symbol includes the character, the number, or the symbol for calling any function among the plurality of functions;
displaying a function selection view on the screen for using the one function, the function selection view displaying the available functions that are selectable by the user, and accepting a selection by the user of one available function from among the displayed available functions;
performing a function calling process of calling the selected available function from among the available functions indicated in the function classification table;
performing the the selected available function to cause the first information processing apparatus to store the data; and
sending information related to the data stored in the first information processing apparatus to the plurality of terminal apparatuses,
wherein
the screen for using the one function is changed to a screen for using the the selected available function that has been called to display an error notification, using a user interface of the other function, in the case where an error occurs in performing processes of the the selected available function that has been called; and
the second information processing apparatus includes
a second processor; and
a second memory storing instructions to be executed by the processor, the execution of the instructions causing the processor to perform processes of:
sending the information related to the data stored in the first information processing apparatus to the plurality of terminal apparatuses.

5. The information processing system according to claim 4,
wherein the first processor sends the information related to the data stored in the first information processing apparatus to the second information processing apparatus when the data are successfully stored in the first information processing apparatus.

6. The information processing system according to claim 4, wherein, when the first information processing apparatus fails to store the data, the first processor causes a failure notification to be displayed in a display unit.

7. An information processing system comprising:
a plurality of terminal apparatuses that has a plurality of functions; and
a first information processing apparatus that stores data received from one terminal apparatus among the plurality of terminal apparatuses, wherein the one terminal apparatus includes
a processor; and
a memory storing instructions to be executed by the processor, the execution of the instructions causing the processor to perform processes of:
receiving an input from a user of at least one among a character, a number, and a symbol into an entry field, which is provided on a screen for using one function among the plurality of functions;
referring to a function classification table that includes classification information of available functions to be called from among the plurality of functions when the input of the at least one among the character, the number, and the symbol includes the character, the number, or the symbol for calling any function among the plurality of functions;
displaying a function selection view on the screen for using the one function, the function selection view displaying the available functions that are selectable by the user, and accepting a selection by the user of one available function from among the displayed available functions;

performing a function calling process of calling the selected available function from among the plurality of available functions indicated in the function classification table;

performing the the selected available function to cause the first information processing apparatus to store the data; and sending information related to the data stored in the first information processing apparatus to the plurality of terminal apparatuses using the second information processing apparatus that sends the message received from the one terminal apparatus to the plurality of terminal apparatuses, wherein the screen for using the one function is changed to a screen for using the the selected available function that has been called to display an error notification, using a user interface of the selected available function, in the case where an error occurs in performing processes of the selected available function that has been called.

8. The information processing system according to claim 7,
wherein the processor sends the information related to the data stored in the first information processing apparatus to the second information processing apparatus when the data are successfully stored in the first information processing apparatus.

9. The information processing system according to claim 7,
wherein, when the first information processing apparatus fails to store the data, the first processor causes a failure notification to be displayed in a display unit.

* * * * *